July 1, 1930.                E. C. RANEY                1,769,072
                AIR CLEANER FOR UTILIZING MECHANISMS
                Filed March 15, 1926         2 Sheets-Sheet 1
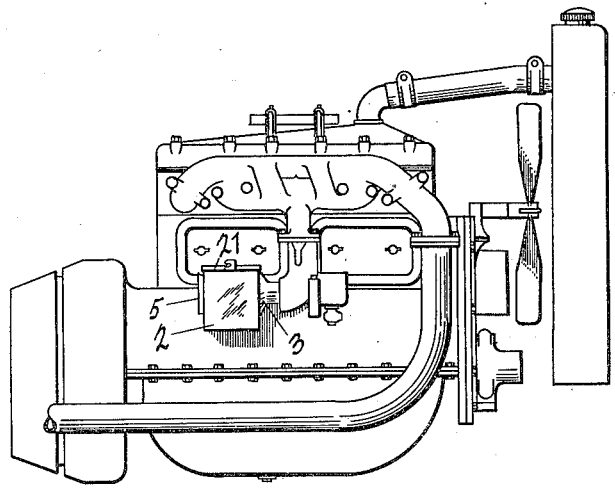
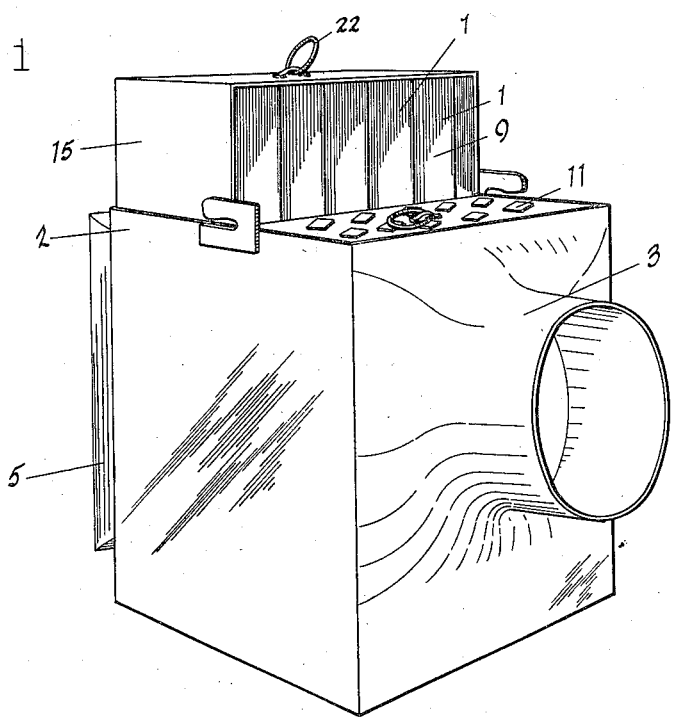
Inventor
Estel C. Raney

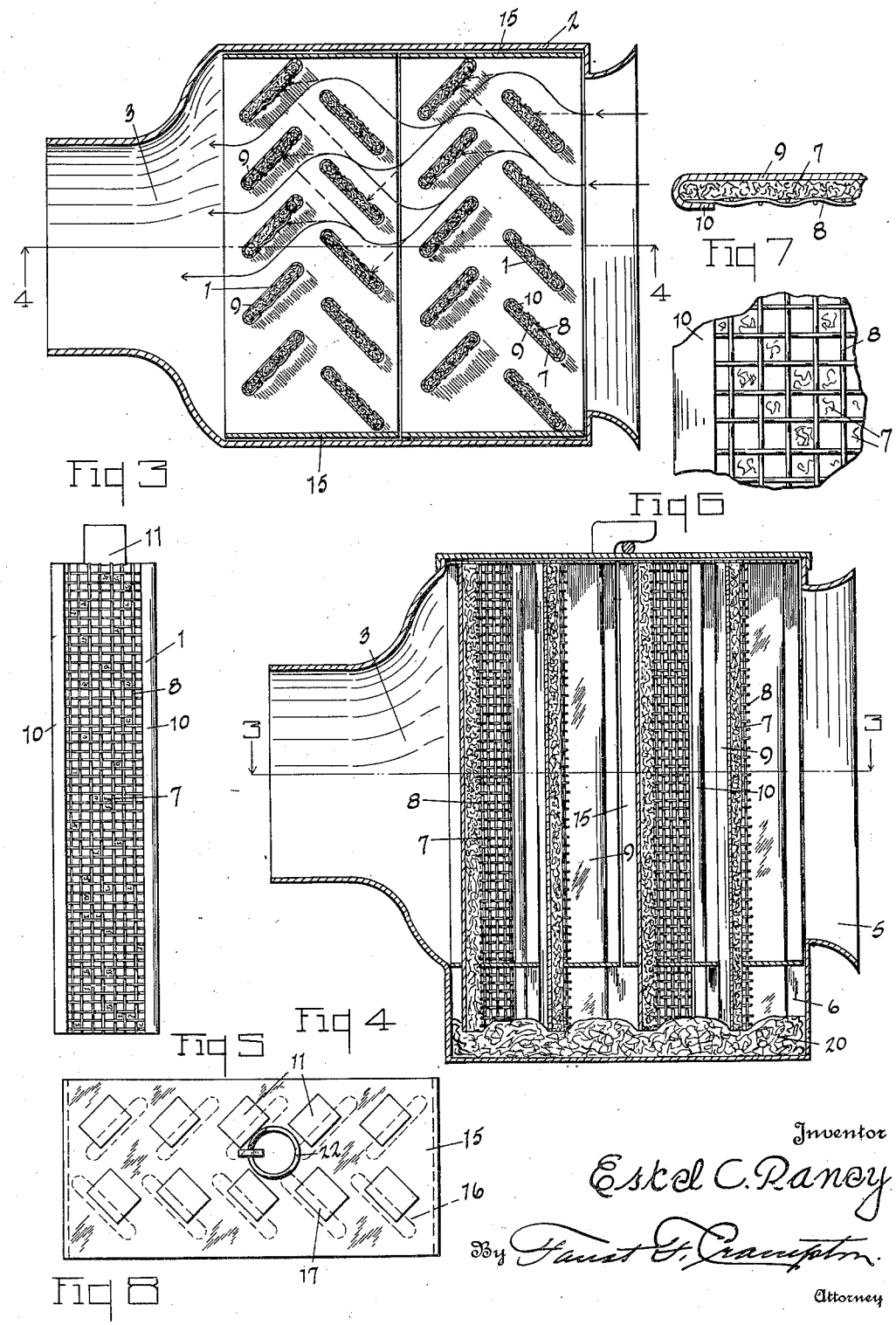

Patented July 1, 1930

1,769,072

UNITED STATES PATENT OFFICE

ESTEL C. RANEY, OF COLUMBUS, OHIO

AIR CLEANER FOR UTILIZING MECHANISMS

Application filed March 15, 1926. Serial No. 94,681.

My invention has for its object to greatly improve the efficiency of dust separators used for removing dust from the air that is drawn into mechanisms that utilize air in their operations, such as, air compressors, internal combustion engines, and the like. Owing to the fact that gritty substances, such, as dust, causes the scoring of cylinder walls, rapid wearing of the pistons, piston rings and bearings, particularly where the dust comes into contact with the oil used for lubricating the mechanism, it is very desirable that the dust should be eliminated from the air that is utilized. My invention particularly has for its object to greatly increase the percentage of the dust that is separated and removed from the air and at the same time to greatly reduce the restrictions of the air flow through the cleaner to the mechanism.

In constructions embodying my invention the air is caused to move through areas that are much larger than the area of the air inlet to the mechainsm and dust adherent material is located on partitioning walls for baffle members to gather the dust as the air moves through the said areas. Preferably, the dust adherent material is located on parts of the cleaner that are so disposed as to cause the air to move sinuously through the cleaner, means being provided for maintaining the dust adherent material in position to collect the dust from the moving current, or currents, of air. The dust adherent material is of such a character that it is substantially non-evaporative and preferably of such a character that it will spread itself over the surface of the body on which, or in contact with which, the dust adherent material is placed. The material used is preferably absorptive and absorbent baffles are used in connection therewith to position the material so that it will collect the dust from the air.

In specific embodiments of my invention I utilize oleiferous material which is practically non-evaporative under normal atmospheric temperatures. If a grease or oil is used it may be spread over the baffle members. Preferably the baffle members are formed of, or contain, an absorbent material. The absorbent material may be impregnated with oil, either by spreading the oil over the absorbent material or a means for containing oil may be provided and the absorbent body may be located so as to draw the oil from the said means. The baffle members are so formed and located as to produce only moderate changes of direction of movement of the air through the cleaner, with the result that practically all of the dust will be caught and collected by the baffle members while the air will pass through the cleaner practically unrestricted. The cleaner has a flaring bell shaped inlet and reverse bell shaped outlet that will cause a reduction of the resultant restriction or impedance to the air flow. The shape of the inlet and outlet of the shell is such as to cause all of the air to move at right angles to planes passing through the smallest areas of each of the inlet and outlet. Thus when the cleaner is connected to the carburetor of an internal combustion engine, the impedance of the air flow at normal speeds of the engine is reduced, while at high speeds the restricted action of the cleaner and the carburetor, by reason of their formation, or the contour of their interconnection, is only slightly greater than that of the carburetor itself.

The invention may be contained in air cleaners of different forms and, to illustrate a practical application of the invention and set forth its operation, I have selected an air cleaner containing my invention as an example of such structures and shall describe it hereinafter. The air cleaner selected for purposes of illustration is shown, in the accompanying drawings, as applied to an internal combustion engine.

Fig. 1 of the drawings illustrates a view of an engine to which my air cleaner is applied. Fig. 2 is a perspective view of the air cleaner, the cover being removed and a baffle plate supporting frame being partially withdrawn. Fig. 3 is a view of a horizontal section taken on the plane of the line 3—3 indicated in Fig. 4. Fig. 4 is a view of a vertical section taken on the plane of the line 4—4 indicated in Fig. 3. Fig. 5 is a view of one of the baffle members. Fig. 6 is an enlarged and broken view of a part of the baffle member shown in Fig. 3. Fig. 7 is a view of a section of the baffle member shown in Fig. 6. Fig. 8 is a top view of one of the frames that is used for supporting the baffle members.

The air cleaner shown in the drawings is connected to the carburetor of the engine. It has a plurality of baffle members 1 that are so disposed as to subdivide the air into thin "sections" or "sheets" and to direct the air along sinuous lines, while the dust particles, being somewhat heavier than the air, will move in straighter lines and strike against the baffle members. The baffle members are charged with a dust adherent material, preferably, an oleiferous material, such as grease or oil and, consequently, the dust will be collected on the baffle members. The baffle members 1 are supported in the shell 2 which has a funneled outlet end 3 that preferably follows in all of its radial cross sections an ogee line. The funneled end reduces the resistance to the air flow at the inlet of the carburetor, the baffle members being so located with respect to each other and the shell 2 being sufficiently large in size as to greatly increase the cross sectional area for the movement of the air through the cleaner over that of the area of the carburetor inlet. The shell has a flaring inlet 5 which, together with the shape of the outlet 3, will compensate, in a large measure, for any restriction to the air flow caused by the baffle members. The net restriction with respect to that of the carburetor, by the addition of the cleaner, will be negative at relatively low speeds as compared to the restrictions of a cylindrical orifice of the same size as the outlet of the shell and will be only slightly greater than the restriction of a cylindrical orifice of the same size as the outlet of the shell at high speeds. The form of carburetor shown in the drawing is of a well known type and has a cylindrical shaped inlet and, consequently, the cleaner shown in the drawings, when connected to such a carburetor, will have a negative effect on the restriction to the air flow at low speeds and only a small positive additional restriction to the air flow through the cleaner and into the carburetor at high speeds.

The shell is provided with a chamber 6 located at the lower end of the shell. The inlet 5 of the cleaner extends substantialy to the top of the chamber 6. The baffle members extend into the chamber. The chamber 6 contains oil and the absorbent material of each of the baffle members absorbs and distributes the oil over the baffle members.

The baffle members 1 of the cleaner extend across the interior of the shell 2. They are provided with an absorbent material 7. Any absorbent material may be used, such as paper, felt, cotton, or asbestos or other porous body. On account of the fraying action of the air current, the absorbent or porous material 7 may be covered with a screen 8 which may be formed of wire mesh and which also coacts to collect and retain the particles of dust because of the recesses and interstices that are formed by the cross strands of wire of which the screen 8 is formed which also becomes covered with dust adhering material. The absorbent material 7 and the screen 8 are secured in position by means of the sheet metal strips each of which has edge portions 10 that are turned over the edges of the absorbent material 7 and the edges of the wire mesh 8. The lower ends of the baffle members may be placed in contact with an oil charged body or, if desired, a grease or oil may be spread over the surface of the screen and the absorbent body. The screen will cooperate to retain the grease or oil on the surface of the baffle member.

The baffle members are arranged in series or sets. The baffle members of each set being located parallel to each other and the baffle members of one set being located substantially in planes that are inclined to the planes of the baffle members of the juxtaposed set. The width of the spaces between the baffle members of each set are such as to locate the leading edges of the baffle members of that set, with reference to the movement of the air from the inlet to the outlet of the shell, opposite intermediate points between the leading and following edges of the juxtaposed baffle members of that set. Also, the leading edges of one set of baffle members are located opposite points intermediate the following edges of the adjoining set of baffle members, the said adjoining set being located nearer the inlet of the shell. This results in dividing the air into sheets or sections as the air passes through the cleaner and also causes recombination and resubdivision of the air streams whereby the air will be caused to move sinuously through the cleaner and produce an intimate contact with the oil charged surfaces of the absorbent material to insure the removal of the dust contained in the air.

The baffle members are mounted in one or more movable frames 15. In the form of construction shown in the drawings, the lower sides of the frames 15 are provided with slots 16 through which the lower end portions of the baffle members extend to make contact with an oil charged body. The upper end of the frames are also provided with cuts, as at 17, through which the ears 11 of the baffle members may be extended and bent down upon the tops of the frames and soldered or spot welded thereto. Any number of baffle members may be used and they may be located in any desired arrangement to thoroughly separate the dust from the air. Any number of frames may be used for supporting the baffle members. In the form of construction shown each frame is provided with two sets of baffle members in order that each set of baffle members may be readily inspected and cleaned, if occasion should require.

The baffle members may extend through the lower ends of the frames sufficiently so as to support the lower ends of the frames a definite distance from the bottom of the cleaner. The lower ends of the frames will thus form the closed chamber 6 in the bottom of the shell of the cleaner. Oil may be inserted in the chamber 6 which will continuously and automatically be fed to the absorbent materials that form a part of each baffle member until the surface of the absorbent material, as well as that of the screen, is entirely covered with the oil. This will also maintain the distribution of the oil over the baffle members.

The lower sides of the frame form a partition that completely covers the oil and forms a substantially closed chamber for the oil that prevents the oil from being caught up by the air. A suitable material, such as felt, or waste, or a powdered material, is located below the frames and so as to make contact with the lower ends of the baffle members. This will prevent free movement of the oil within the oil chamber, but will readily capillarically yield the oil to the baffle members and thus feed the oil to the members.

The top of the cleaner may be closed by a cover 21 that may be secured by any suitable means. The frames 15 may be inserted or withdrawn through the top. If desired, rings 22 may be connected to the frames for conveniently withdrawing and handling the frames.

I claim:

1. In an air cleaner for air utilizing mechanisms, a shell having openings at the opposite ends thereof, two sets of baffle members having absorbent material, metallic screens for covering the said baffle members, each of said sets having two series of said baffle members, the baffle members of each series located in substantially parallel planes, the planes inclined to the line extending through the openings and the width of the baffle members and the spaces between the baffle members being such as to locate the leading edges of the baffle members with reference to the moving air opposite intermediate points between the leading and following edges of the juxtaposed baffle members, the leading edges with respect to the air flow of one set of the baffle members being located opposite points intermediate between the following edges of the other set of baffle members.

2. In an air cleaner for air utilizing mechanisms, a shell having openings at the opposite ends thereof, two sets of baffle members having absorbent material, each of said sets having two series of said baffle members, metallic screens for covering the said baffle members, the baffle members of each series located in substantially parallel planes, the planes inclined to the line extending through the openings and the width of the baffle members and the spaces between the baffle members being such as to locate the leading edges of the baffle members with reference to the moving air opposite intermediate points between the leading and following edges of the juxtaposed baffle members, the leading edges with respect to the air flow of one set of the baffle members being located opposite points intermediate between the following edges of the other set of baffle members, and a frame removably supported in the shell and for supporting the said baffle members.

3. In an air cleaner for air utilizing mechanisms, a shell having openings at the opposite ends thereof, two sets of baffle members having absorbent material, each of said sets having two series of said baffle members, the baffle members of each series located in substantially parallel planes, the planes inclined to the line extending through the openings and the width of the baffle members and the spaces between the baffle members being such as to locate the leading edges of the baffle members with reference to the moving air opposite intermediate points between the leading and following edges of the juxtaposed baffle members, the leading edges with respect to the air flow of one set of the baffle members being located opposite points intermediate between the following edges of the other set of baffle members, the shell having an oil chamber and a loose fibrous material located in the oil chamber, the baffle members placed absorbently in contact with the fibrous material.

4. In an air cleaner for air utilizing mechanisms, a shell having openings at the opposite ends thereof, two sets of baffle members having absorbent material, each of said sets having two series of said baffle members, metallic screens for covering the said baffle members, the baffle members of each series located in substantially parallel planes, the planes inclined to the line extending through the openings and the width of the baffle members and the spaces between the baffle members being such as to locate the leading edges of the baffle members with reference to the moving air opposite intermediate points between the leading and following edges of the juxtaposed baffle members, the leading edges with respect to the air flow of one set of the baffle members being located opposite points intermediate between the following edges of the other set of baffle members, the shell having an oil chamber, a loose fibrous material located in the oil chamber, the lower ends of the baffle members placed absorbently in contact with the loose fibrous material.

5. In an air cleaner for carburetors, a shell having an air inlet and an air outlet, the air outlet of the shell connected to the intake of the carburetor, whereby air is passed through the shell to the carburetor, the shell having a partitioning wall forming a chamber in its lower part and an air chamber in its upper part, a set of substantially parallel baffle members extending across the air chamber of the shell and severally located in planes that are inclined to a line extending between the centers of the inlet and outlet of the shell, a second set of substantially parallel baffle members severally located in planes at an angle to the said line and extending across the shell and also located at an angle to the planes of the first set of baffle members, the width of and the spaces between the baffle members of each set being such as to locate the leading edges of the baffle members with reference to the moving air opposite intermediate points between the leading and following edges of the juxtaposed baffle members, the leading edges of the first set of baffle members being located opposite points intermediate the following edges of the second set of baffle members and the following edges of the first set being located nearer the inlet of the shell than the leading edges of the second set, an oil impregnated material located in the chamber at the bottom of the shell, the baffle members having absorbent material absorbently in contact with the oil impregnated material.

6. In an air cleaner for a carburetor, a shell having an air inlet and an air outlet, the outlet of the shell connected to the intake of the carburetor, a plurality of air impenetrable baffle members located in the shell and in planes inclined to the line connecting the centers of the inlet and the outlet of the shell, and having absorbent material in sheet form, a rigid material in sheet form covering one side of the absorbent material, oil impregnated material, the absorbent material of the baffle members held absorbently in contact with the oil impregnated material by the rigid sheet material.

7. In an air cleaner for a carburetor, a shell having an air inlet and an air outlet, the outlet of the shell connected to the intake of the carburetor, a plurality of air impenetrable baffle members located in the shell and in planes inclined to the line connecting the centers of the inlet and the outlet of the shell and having absorbent material in sheet form and a rigid sheet material covering one side of the absorbent material, oil impregnated material, the absorbent material of the baffle members held absorbently in contact with the oil impregnated material by the rigid sheet material, and wire screens for covering the absorbent material of the baffle members for preventing fraying of the absorbent material by the rush of the air through the shell.

8. In an air cleaner for a carburetor, a shell having an air inlet and air outlet, the outlet of the shell connected to the intake of the carburetor whereby air is passed through the shell to the carburetor, the shell having a partitioning wall forming a chamber in its lower part and an air chamber in its upper part, a plurality of air impenetrable baffle members located in the air chamber of the shell and inclined to the line connecting the centers of the inlet and the outlet of the shell and having an absorbent material in sheet form, an oil impregnated material located in the chamber at the bottom of the shell, a rigid material in sheet form extending through the partitioning wall for maintaining the absorbent material on the baffles in position in the chambers and in contact with the impregnated material in the chamber in the lower part of the shell.

9. In an air cleaner for air utilizing mechanism, a shell having a chamber for containing a liquid at the bottom thereof, means for connecting the shell with the mechanism, a plurality of baffle members of absorbent material in sheet form for deflecting the air that passes through the shell, the cleaner having a means for absorbently conducting the liquid to the baffle member, a plurality of frames for removably supporting the baffle members, the lower sides of the frames spaced from one side of the shell, the baffle members being arranged in series, the baffle members of each series being located substantially in parallel arrangement, each series of baffle members extending across the shell and across the general direction of the air flow, the lower sides of the frames coacting to cover the liquid and close the chamber.

10. In an air cleaner, a shell, a plurality of baffle members having absorbent material in sheet form, a plurality of frames for removably supporting the baffle members, the lower sides of the frames forming a dividing wall separating the interior of the cleaner into two chambers, one, the air chamber through which the air moves and the other, a substantially closed chamber for containing an oily material, the absorbent material extending into the air chamber and means for absorbently conducting the oily material to the absorbent material in the air chamber.

In testimony whereof I have hereunto signed my name to this specification.

ESTEL C. RANEY.